April 19, 1932. R. LABORDA 1,854,473
AMUSEMENT APPARATUS
Filed March 3, 1931 4 Sheets-Sheet 2
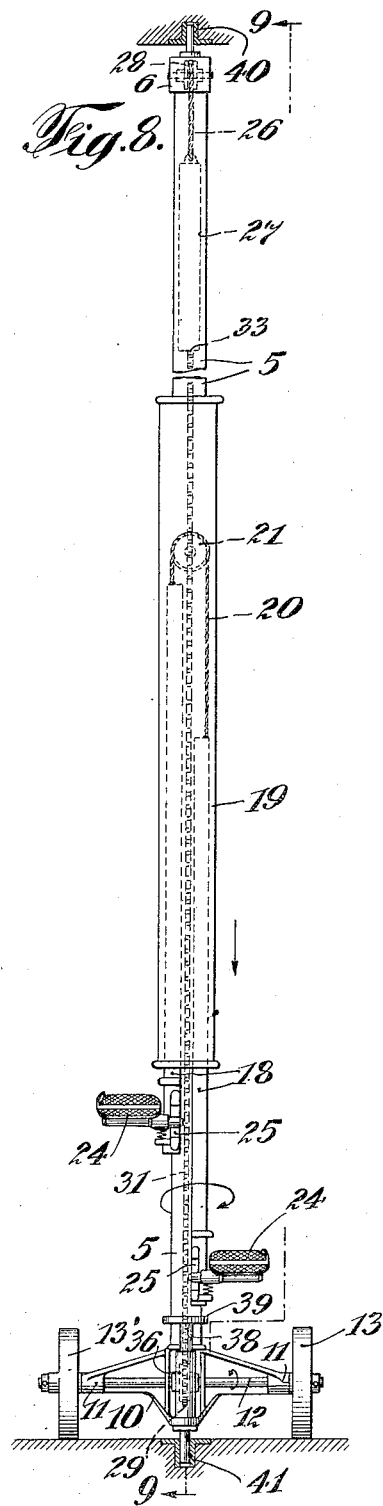
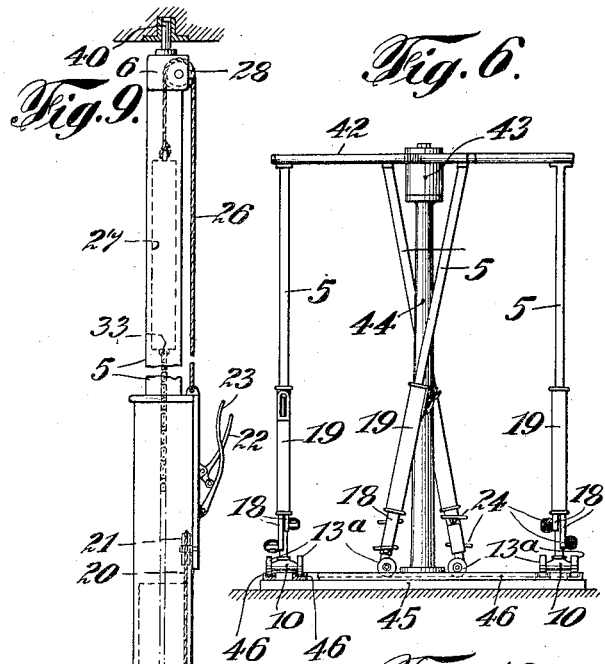
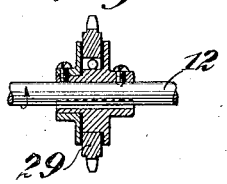
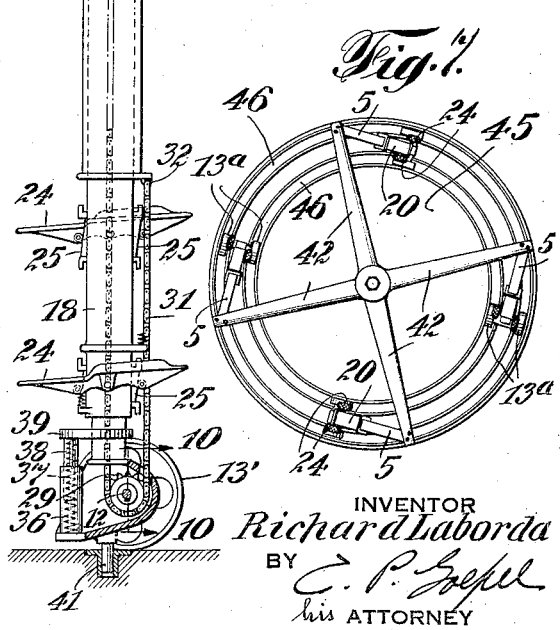
INVENTOR
Richard Laborda
BY
his ATTORNEY April 19, 1932.  R. LABORDA  1,854,473
AMUSEMENT APPARATUS
Filed March 3, 1931  4 Sheets-Sheet 3
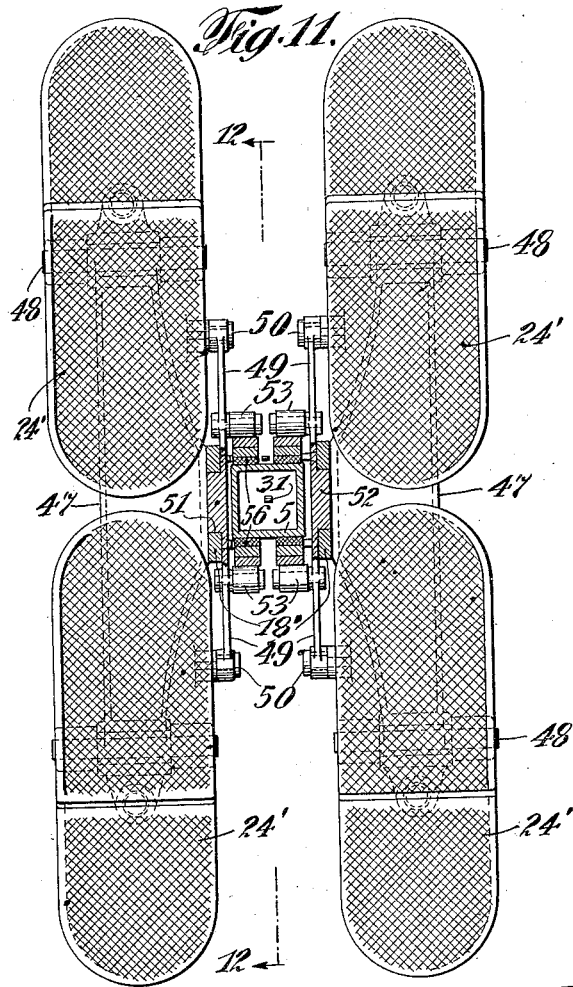
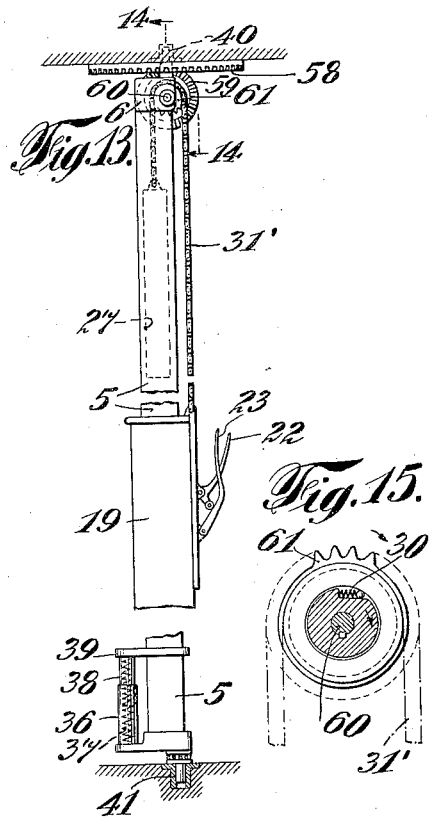
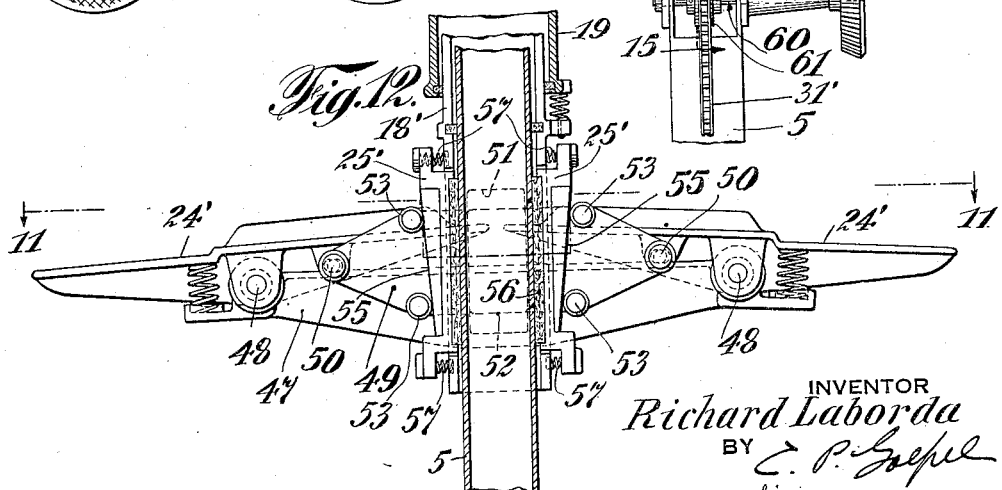
INVENTOR
Richard Laborda
BY
his ATTORNEY April 19, 1932.  R. LABORDA  1,854,473
AMUSEMENT APPARATUS
Filed March 3, 1931  4 Sheets-Sheet 4
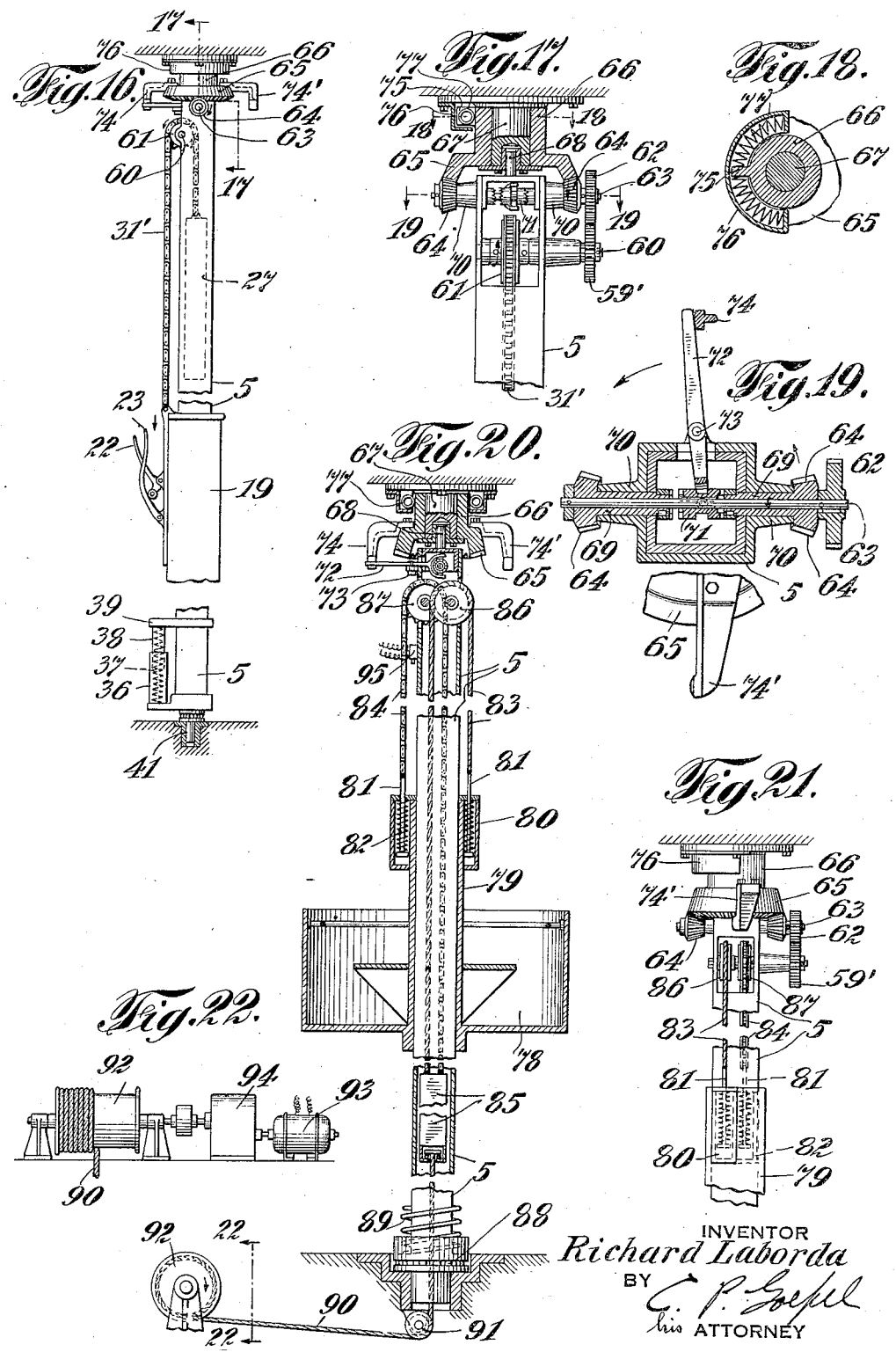

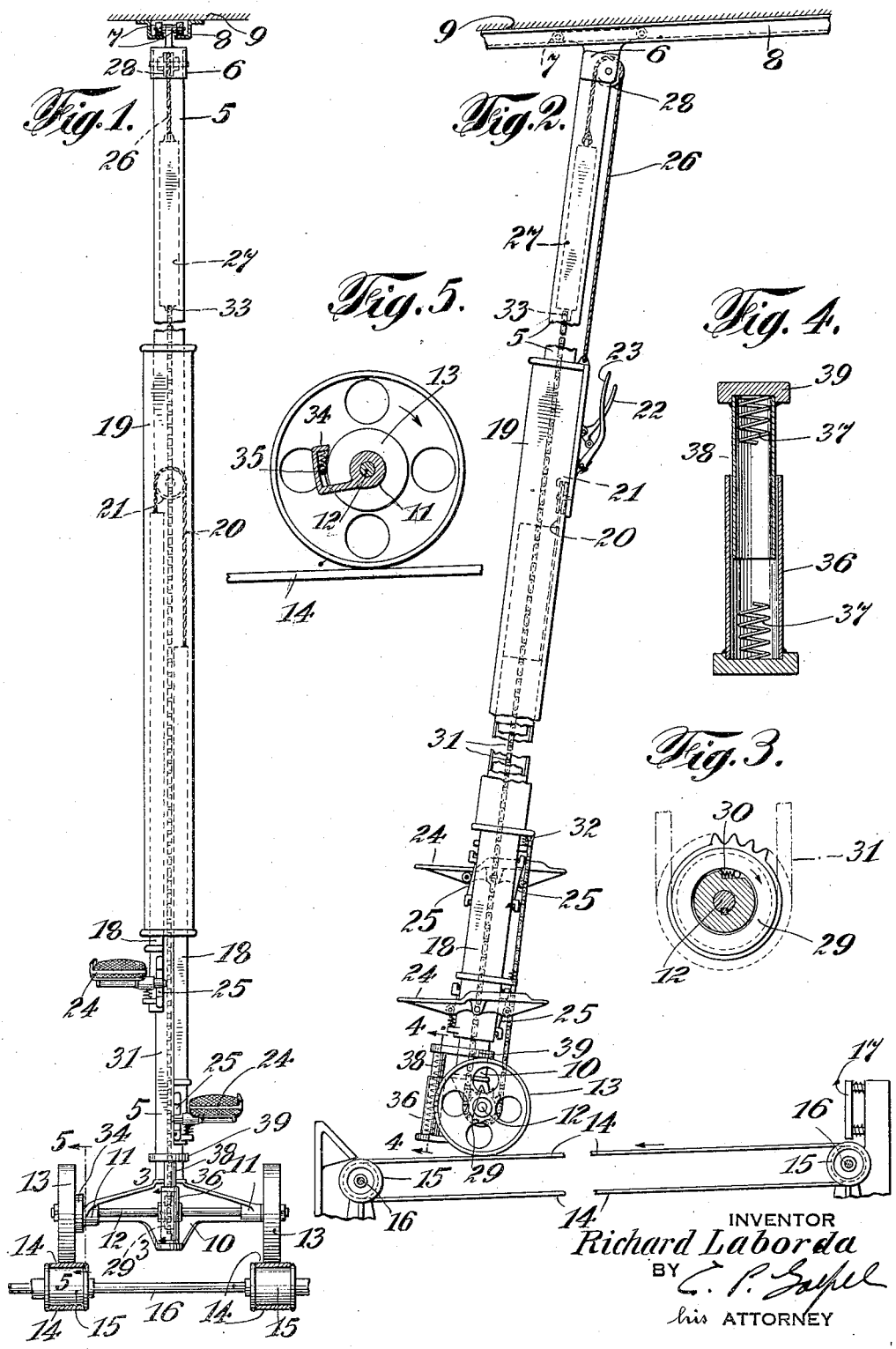

Patented Apr. 19, 1932

1,854,473

UNITED STATES PATENT OFFICE

RICHARD LABORDA, OF BROOKLYN, NEW YORK

AMUSEMENT APPARATUS

Application filed March 3, 1931. Serial No. 519,780.

This invention relates to amusement apparatus, and has for its primary object and purpose to provide a simply constructed and efficiently operating device for use at amusement parks for the purpose of transporting or carrying one or more persons or passengers between spaced points.

It is another object of the invention to provide such a device operated by the passenger so that a number of such devices may be employed in races between the individual passengers or operators thereof.

It is also a further object of my invention to provide a device of this kind embodying a movably mounted column together with passenger operated means thereon whereby the passenger may ascend or descend said column, and means operatively engaged with the passenger operated means to cause a bodily movement of said column during the vertical movement of the passenger thereon in one direction.

It is also an additional object of my invention in one practical form thereof to provide supporting wheels for the lower end of the column engaged upon power operated belts, said wheels being releasably coupled with the passenger operated climbing means on the column so that in the vertical movement of the passenger in one direction, the column with the passenger thereon will be moved to one end of said belts while in the movement of the passenger on the column in the opposite direction, said belts will cooperate with said supporting wheels to move the column and the passenger in the opposite direction towards the other or starting end of the power driven belts.

In another practical form of my invention, I propose to pivotally mount the column at its upper and lower ends and provide means for automatically alternately rotating the column in reverse directions through 180° in the vertical movement of the passenger carrying means along said column.

With the above and other objects in view, the invention consists in my improved amusement apparatus, and in the form, construction and relative arrangement of its several parts as will be hereinafter more fully described, illustrated in the accompanying drawings, and subsequently incorporated in the subjoined claims.

In the drawings, wherein I have illustrated several simple and practical forms of the essential features of my present improvements, and in which similar reference characters designate corresponding parts throughout the several views,—

Figure 1 is a front elevation of an amusement device constructed in accordance with one embodiment of the present invention;

Fig. 2 is a side elevation thereof;

Fig. 3 is a detail sectional view on an enlarged scale taken on the line 3—3 of Fig. 1;

Fig. 4 is a detail sectional view taken on the line 4—4 of Fig. 2;

Fig. 5 is an enlarged detail vertical section taken on the line 5—5 of Fig. 1;

Fig. 6 is a side elevation illustrating another adaptation of the essential feature of my invention;

Fig. 7 is a top plan view thereof;

Fig. 8 is a front elevation showing another alternative embodiment of the device;

Fig. 9 is a side elevation, certain parts being illustrated in section, as indicated by the line 9—9 of Fig. 8;

Fig. 10 is an enlarged detail sectional view taken on the line 10—10 of Fig. 9;

Fig. 11 is a horizontal sectional view showing a modification of the pedal operated braking means for the climbing device taken substantially on the line 11—11 of Fig. 12;

Fig. 12 is a vertical sectional view taken on the line 12—12 of Fig. 11;

Fig. 13 is a side elevation showing still another adaptation of my present invention;

Fig. 14 is an enlarged detail sectional view taken on the line 14—14 of Fig. 13;

Fig. 15 is a sectional view taken on the line 15—15 of Fig. 14;

Fig. 16 is a side elevation of a further alternative form of the invention;

Fig. 17 is a detail vertical sectional view taken on the line 17—17 of Fig. 16;

Fig. 18 is a horizontal sectional view taken on the line 18—18 of Fig. 17;

Fig. 19 is a horizontal section taken on the line 19—19 of Fig. 17;

Fig. 20 is a vertical sectional view showing a further adaptation of my present improvements;

Fig. 21 is a detail fragmentary elevation of the latter form of the device, and

Fig. 22 is a detail view showing the operating means for the device illustrated in Fig. 20.

Referring now in detail to the invention as illustrated in Figs. 1 to 5 of the drawings, the column 5 which is preferably of rectangular form in cross section is provided with a head 6 at its upper end connected with the carriage 7 which is mounted to travel in a suitable track way 8 secured to a longitudinally inclined beam or other fixed structural part indicated at 9. This column at its lower end is fixed to a suitable frame indicated at 10 having spaced bearings 11 for the shaft or axle 12 on opposite ends of which the wheels 13 are fixed. These wheels respectively bear upon the upper stretches of the spaced power-driven belts 14 which are longitudinally inclined in substantially parallel relation to the trackway 8 between the spaced pairs of flanged belt wheels or pulleys 15 fixed upon the shafts 16, one of which has a suitable driving connection with the motor or other source of power. Above the wheels 15 at the upper ends of the inclined belts 14 suitable yieldably mounted bumper members 17 are arranged.

With the column 5, a manually operable climbing means is associated. Since this climbing means is substantially identical with that shown in my co-pending application Serial Number 519,779 filed of even date herewith, it need not herein be described in detail. For the purpose of this explanation, it will suffice to state that the said climbing means includes complementary channel shaped members 18 which are mounted for relatively sliding movement upon opposite sides of the column 5, the major portions of said movable members 18 being enclosed within a relatively movable sleeve 19 which also surrounds the column 5. The upper ends of the members 18 are movably connected with the sleeve 19 interiorly thereof by means of the rope or cable 20 which is engaged around the guide sheave or pulley 21 carried by said sleeve. The upper end of the sleeve 20 is also provided with suitable braking means to cooperate with the column 5 which is actuated by the brake applying levers designated at 22 and 23 respectively.

The lower end of each of the members 18 carry a pivotally mounted pedal 24 having means cooperating with brake shoes indicated at 25 in the pivotal rocking movement of the pedal in relatively opposite directions to apply or release said brake shoes with respect to the opposite side walls of the column 5.

The upper end of the sleeve 19 is connected by the rope or cable 26 with a counterweight 27 movable within the column 5, said cable passing around the guide sheave or pulley 28 mounted in the head 6 on the upper end of said column. As thus far described, the climbing means is the same as that shown in my co-pending application, and in the alternate application and release of the brake means operated by the foot pedals 24 and the progressive upward movement of the sleeve 19 along the column, it will be readily understood that an operator or passenger standing upon said pedals may quickly ascend the column 5.

In the utilization of such a manually operated climbing means, for the purpose of my present invention, I provide upon the central portion of the shaft or axle 12 a sprocket wheel 29 having a suitable conventional form of clutch 30 associated therewith to lock said sprocket wheel to the axle for unitary turning movement in one direction and release said sprocket wheel for turning movement relative to the axle in the opposite direction. A sprocket chain 31 is engaged with the teeth of the sprocket wheel 29 and has one of its ends attached to the lower end of the sleeve 19 as indicated at 32. This chain extends upwardly within the column 5 and has its other end attached as at 33 to the lower end of the counterweight 27.

The frame 10 at one end thereof and adjacent to one of the wheels 13 is provided with an angularly projecting arm 34 upon which a suitable clutch device 35 is mounted to cooperate with the wheel hub 13′ whereby the two wheels 13 and the shaft or axle 12 will be locked to the frame 10 against turning movement with relation to said frame in one direction.

The lower end of a housing tube 36 for a cushioning spring 37 is suitably fixed to the frame 10. The spring 37 also extends upwardly into a second tube 38 telescopically engaged within the tube 36 and has its upper end fixed to a collar 39 loosely surrounding the lower end of the column 5. This spring acts as a bumper to yieldingly cushion the downward movement of the climbing members 18 to their lowermost positions on the column.

For the purpose of providing an amusement apparatus in the form of competitive racing between persons or individuals, a number of the devices as above described are arranged in suitably spaced relation, and the contestants each takes his position upon the pedals 24 of one of the devices which is located at the starting point, or at the lower ends of the inclined belts 14. These belts may be made of linked metal plates, or other substantially constructed units maintained under the desired tensional strain between the end rollers 15 so as to support the column 5 with the weight of the operator thereon against undue sagging of the movable belts. The individual operators by then alternately actuating the foot pedals 24 climbs to the upper end of the column 5. In this movement of the sleeve 19 along said column, the outer end of chain 25 is pulled upwardly around sprocket wheel 29, revolving said sprocket wheel freely on the axle 12 without rotating said axle or the wheels 13. In other words, during the upward or climbing movement, the device remains stationary relative to the belts 14, the wheels 13 and axle 12 being revolved by frictional contact of the wheels with said belts.

After the contestant reaches the top of the column 5, he releases the brakes controlled by foot pedals 24 and levers 22 and 23 so that he rapidly descends the column by gravity against the action of the counterweight 27. In the upward movement of the counterweight and the pull on the chain 31, sprocket 29 is rotated in the direction indicated by the arrow in Fig. 3, and being locked by the clutch 30 to the shaft 13, said shaft is rotated in the same direction to rotate the wheels 13 fixed on said shaft in the direction indicated by the arrow in Fig. 5. These wheels having frictional traction engagement with the upper stretches of the belts 14 propel the device and the operator towards the upper ends of the inclined belts. The operator or contestant having reached the lower end of the column then manipulates the foot pedals 24 to again climb to the upper end of the column as rapidly as possible. During this upward movement of the operator upon the column, the latter has a retrograde gravity movement backwardly towards the starting ends of the conveyers 14. It will be understood that the conveyers are moved very slowly so that the shaft 12 and wheels 13 are locked in connection with frame 12 by the clutches 35 against turning movement in a reverse direction to that indicated by the arrow in Fig. 5 of the drawings. Therefore, in this retrograde movement of the device towards the starting ends of the belts 14, the wheels 13 will have merely a sliding and no rotative movement upon said belts. Thus, the rapidity with which the contestant can ascend the column 5 will determine the extent of such retrograde movement and the rate of progression of the device towards the upper ends of the inclined belts. When the frame 10 strikes the bumper member 17, a bell, lamp or other suitable form of signal may be automatically operated to indicate the winner of the race.

From the above, it will be seen that this form of my invention provides a simply constructed apparatus for use at amusement parks and like places, in competitive racing contests of a very novel and exciting character.

In Figs. 6 and 7, I have shown the essential feature of my invention embodied in an apparatus of the general type referred to as a carrousel, and in which the operating power therefor is furnished by the several riders. Thus in this case, the upper ends of the several spaced columns 5 are connected to the outer ends of the arms 42 radiating from a central hub 43 suitably mounted to freely rotate upon the upper end of a fixed post or standard 44, the lower end of which is suitably secured to the base 45. This base is provided on the outer portion thereof with spaced concentric trackways 46 for the rollers or wheels 13ª which are mounted upon the lower ends of the respective columns 5 and actuated by the manually operable means associated therewith, in exactly the same manner as the wheels 13 heretofore referred to. Thus, it will be seen that this form of my invention provides a very simple and inexpensive amusement apparatus which might be readily procured by private persons or installed in municipal playgrounds.

In Figs. 8, 9 and 10 of the drawings, I have shown another adaptation of my invention, in which the column 5 is pivotally or rotatably supported at its upper and lower ends in suitable bearings as indicated at 40 and 41 respectively. The frame 10 at the lower end of the column carries the wheel axle 12 as in the construction previously described, but in this case, one of the wheels as 13′ is loosely mounted upon one end of said axle, while the other wheel 13 is fixed to the opposite end of the axle. The chain 31 is also connected to the axle 12 by means of the sprocket wheel 29 as above referred to so as to effect the positive rotation of said axle in the downward movement of the climber upon the column 5. Thus, since the wheel 13 has tractive engagement with the floor or ground surface as shown in Fig. 8, it will be understood that in such positive rotation of the shaft or axle 12, the wheels 13 and 13′ will rotate in relatively opposite directions around the central axis of the column so that said column, and the operator standing on the pedals 24 will be continuously rotated, during the downward gravity movement of the operator along the column.

In Figs. 11 and 12 of the drawings I have shown another form of the pedal operated climbing mechanism, in which two persons may take positions at opposite sides of the column, and each control the operation of one pair of the brake shoes. To this end, the slide members 18′ are provided at their lower ends with the horizontally disposed parts 47 extending laterally in opposite directions from said members. Upon each end of each of these parts 47 a pedal 24′ is pivotally mounted as at 48. A plate 49 having tapering end portions is pivotally connected at its extremities as at 50 to the inner sides of the pedals 24′ mounted on each of the parts 47, said pivots 50 being located between the pivots 48 of the respective pedals and the column 5. The plates 49 extend across the inner sides of the respective channel members 18′; the side flanges of said members being cut away or recessed to accommodate said plates. The walls of these channel members are suitably thickened or reinforced and provided with vertically elongated openings 51 therethrough to receive the lugs or bosses 52 formed on the outer faces of the plates 49. Each of the plates 49 carries two pairs of rollers 53, rollers in each pair being vertically spaced apart and engaging the obliquely inclined surfaces 55 of brake shoes 25', each of which is provided with a frictional brake lining indicated at 26 for engagement with one side wall of the column 5. These brake shoes are yieldingly urged to released positions by means of suitable springs 57 interposed between the upper and lower ends of the brake shoes and the side flanges of the members 18'. It will be noted that the surfaces 55 of the brake shoes engaged by the pairs of rollers 53 on the same plate 49 are obliquely inclined downwardly and inwardly from their upper to their lower ends. By means of this construction, if will be seen that when the pedals 24' are in a substantially horizontal position, the brake shoes are released so that the members 18' may slide freely along the column 5. When the pedals 25 are rocked in either direction from this normal horizontal position, the plates 49 will be shifted vertically, thus causing inward bearing pressure by either of the upper or lower rollers 53 on said plates against the inclined surfaces 55 of the brake shoes to urge said brake shoes inwardly and cause the linings 56 thereof to frictionally grip the walls of the column and thereby hold the members 18' against sliding movement. Accordingly, these pedals 24' may be easily operated in synchronized relation by the individual or persons positioned opposite each other to free the members 18' for gravity movement along the column or to lock either of said members against such movement, while the other member is being moved upwardly along the column, in the operation of climbing.

In Figs. 13, 14 and 15, I illustrate another arrangement, in which the post or column is pivotally mounted as in Fig. 8 at its upper and lower ends, but instead of affecting rotation of said post in the manner above described, I secure to the ceiling or beam, a crown gear 58 with which a gear wheel 59 secured to one end of a shaft 60 journalled in suitable bearings on the upper end of the column is in constant mesh. A sprocket wheel 61 is fixed upon said shaft and engaged by the chain 31'. The sprocket 61 is provided with the clutch means to releasably lock said sprocket to the shaft so that in the upward movement of the climber on the column, said column remains stationary in the movement of chain 31', while in the downward gravity movement, the column will be rotated.

In Figs. 16 to 19 inclusive, I show another alternative embodiment of my invention, in which the gear 59' on the end of shaft 60 is in constant mesh with a gear 62 fixed to one end of a shaft 63 mounted upon the column 5 above and in parallel relation to shaft 60. Upon the shaft 63 the two pinions 64 are loosely mounted and have constant meshing engagement at diametrically opposite points with the teeth of the crown gear 65 formed on the lower end of a sleeve 66 rotatably supported upon the stud 67 which is suitably fixed to the stationary beam or ceiling and in which the pivot 68 on the upper end of the column 5 is journalled. Each of the pinions 64 is provided with a hub extension 69 mounted in the bearing extension 70 on opposite sides of the column 5. The inner ends of these hub extensions 69 of the pinions are provided with suitable clutch teeth for engagement by complementary clutch teeth on opposite ends of a shiftable collar 71 which is keyed upon the central portion of the shaft 63. This collar is actuated by a lever 72 fulcrumed intermediate of its ends as at 73 upon one wall of the column 5. To the crown gear 56 at diametrically opposite sides thereof, radially extending arms 74 are fixed having their outer ends downwardly turned as at 74' for engagement by the outer end of lever 72.

The sleeve 66 at its upper end is provided with a radially projecting lug 75 extending into a suitable housing 76 in which the coil springs 77 are arranged at opposite sides of the lugs 75 for the purpose of yieldingly cushioning rotative movement of the sleeve 66 and gear 65 in either direction from a normal position.

By means of the above construction, it will be understood that, assuming that one of the pinions 64 is locked to shaft 63 by the clutch collar 61, in the downward movement of the operator or climber upon the column 5, rotation is transmitted to said pinion with the gears 59 and 62, and said pinion being in mesh with the crown gear 65 will cause the rotation of the column in one direction through 180° or until the end of lever 72 strikes the end of one of the arms 74. The clutch collar 71 will then be shifted to release the formerly locked pinion 64 and lock the other of the pinions to the shaft 63, whereupon, in the continued rotation of said shaft, the rotation of column 5 will be reversed. This operation will be repeated and the column alternately rotated in opposite directions until the operator reaches the lowermost position on the column. By the loose mounting of the crown gear 65 and the provision of the springs 77, shock or jar and possible damage or injury to the parts of the mechanism upon the lever 72 striking the arm 74 is obviated.

In Figs. 20 to 22 of the drawings, another arrangement is shown, in which means for alternately rotating the column in reverse directions as above described is provided, but instead of the pedal actuated climbing mechanism, a car or carriage 78 for one or more persons is slidably mounted on the column. This carriage has a central rectangular tubular post 79 closely surrounding the column 5 and provided at its upper end with a housing 80 for vertically movable rods 81 and cushioning springs 82. The upper ends of these rods are attached to one end of a cable 83 and chain 84 respectively, the other ends of which are secured to the upper end of a counterweight 85 vertically movable in the column. The cable 83 is engaged over sheave 86 mounted in the upper end of the column while chain 84 is similarly engaged with the sprocket 87. In this case, I have shown an anti-friction ball or roller bearing 88 for the lower end of the column having an upper hollow portion providing a seat for the lower end of the cushioning spring 89 which yieldingly cushions the downward movement of carriage 78 to its lowermost position.

To the lower end of the counterweight 85, a cable 90 is attached, said cable extending downwardly through the hollow column 5 and around a suitable guide sheave 91 to the winding drum 92 actuated by motor 93 through a suitable speed reduction gearing 94. The operation of motor 93 is controlled by the switch 95 arranged upon one side of the column 5 at the upper end thereof and having a movable part actuating said switch to the off position which is engaged and operated automatically by contact of the upper end of the carriage post 79 therewith.

The shaft or the sprocket 87 is geared to the shaft 63 for the operation of the column rotating mechanism in the same manner as illustrated in Figs. 17 and 19 of the drawings.

In the last described construction, it will be understood that a switch 95 is moved to closed position to wind the cable 90 on drum 92 and raise the carriage 78 to an upper level or floor. Suitable means may be provided for temporarily retaining or locking the carriage in this position until the passengers enter the same. The circuit of motor 93 is automatically broken to limit this upward position of the carriage to the loading position by the actuation of the switch 92 to open position as above referred to. After the carriage has been loaded, the retaining or latching means therefor is released so that the carriage will descend by gravity and be simultaneously rotated alternately in opposite directions. The descent of the carriage will be checked by the counterweight 85 and the resistance to the unwinding of the cable 90 from drum 92 so that the descent of the carriage even when fully loaded will be comparatively slow.

It will, however, be apparent that such an apparatus might also be used for the purpose of elevating persons from a lower to an upper level, in which case the counterweight will be lighter than the car or carriage so that the latter can return by gravity to the starting point. I may also of course, adopt a reverse arrangement wherein the counterweight is heavier than the car or carriage so as to raise or elevate the empty car or carriage from the lower to the upper level, and without the use of a motor or other operating means. In such case of course, safety means will be provided to prevent movement of the car in either direction when the entrance door thereof is open.

From the above description considered in connection with the accompanying drawings, the several illustrated embodiments of the invention will be fully and clearly understood. It will be seen that I have provided an amusement apparatus of this kind in which the novel features of my co-pending application may be embodied and wherein the several additional parts of the mechanism are of relatively simple form and construction. Thus, such an amusement apparatus may be installed at comparatively small cost, and provides a very novel and attractive amusement device of this kind. In my present disclosure, I have referred to several mechanical constructions of the novel features of the invention, which I believe to be entirely practical for the purpose in view, nevertheless it will be understood that insofar as the several detail parts of the apparatus are concerned, they might also be incorporated in various other alternative structural forms, and I accordingly reserve the privilege of resorting to all such legitimate changes therein which may be fairly considered within the spirit and scope of the invention as claimed.

I claim:

1. In amusement apparatus, a substantially vertically positioned movable column, means on said column for raising and lowering a passenger, and means automatically actuated in the movement of said first named means in one direction on the column to automatically move said column.

2. In amusement apparatus, a substantially vertically positioned movable column, passenger controlled means associated with said column for raising and lowering a passenger thereon, and means actuated by said passenger controlled means in the movement of the passenger in one direction to automatically move said column.

3. In amusement apparatus, a substantially vertically positioned movable column, a movable horizontally inclined traction surface supporting the column at its lower end for movement between spaced points, a supporting wheel on the lower end of the column engaged upon said traction surface, passenger operated means on the column for ascending and descending the same, means operatively connecting a part of the passenger operated means with said wheel to rotate the latter in one direction and cause a bodily movement of the column towards the upper end of the inclined traction surface upon movement of the passenger in one direction along said column, and means for locking said wheel against reverse rotation in the movement of the passenger in the opposite direction to cause a gravity retrograde bodily movement of the column with respect to said traction surface.

4. In amusement apparatus, a substantially vertically positioned movable column, passenger operated means on said column for ascending and descending the column, said means including a sleeve surrounding said column, horizontally inclined movable traction surfaces, a pair of wheels rotatably mounted on the lower end of the column and engaged upon the respective traction surfaces, means operatively connected with said sleeve for rotating said wheels in the movement of the passenger in one direction along said column and in the reverse direction to the movement of the traction surfaces to cause movement of said column towards the upper ends of said inclined traction surfaces, and means for locking said wheels with respect to the column against reverse rotation in the movement of the passenger in the opposite direction whereby said movable traction surfaces cause a retrograde movement of the column towards the starting position.

5. In amusement apparatus, a substantially vertically positioned movable column, supporting wheels mounted on the lower end of said column, horizontally inclined movable traction surfaces engaged by said supporting wheels, manually operable means mounted on the column for ascending the same and including means controllable by the operator to permit gravity descent of the column, said means including a movable part geared to said wheels to rotate the same in one direction upon the descent of the passenger along the column to cause the bodily movement of the column towards the upper ends of said inclined traction surfaces, and means for locking said wheels against reverse rotation during the ascent of the passenger along said column whereby said movable traction surfaces cause a retrograde movement of the column towards the starting point.

6. In amusement apparatus, a substantially vertically positioned rotatably mounted column, passenger supporting means movably mounted on said column, and means operatively connected with the passenger supporting means and automatically actuated thereby in the movement of said means in one direction to cause a concurrent rotary movement of the column and said passenger carrying means.

7. In amusement apparatus, a substantially vertically positioned rotatably mounted column, passenger supporting means movably mounted on said column, and means operatively connected with the passenger supporting means and automatically actuated thereby in the movement of said means in one direction to cause concurrent alternate rotary movements of the column and the passenger carrying means in opposite directions through substantially 180°.

8. In amusement apparatus, a vertically positioned rotatably mounted column, manually operable means mounted on said column for ascending and descending the same, said means including a movable part, and gearing automatically actuated by said movable part in the movement of said manually operable means in one direction along the column to effect a concurrent rotative movement of the column.

9. In amusement apparatus, a vertically positioned rotatably mounted column, manually operable means mounted on said column for ascending and descending the same, said means including a movable part, gearing automatically actuated by said movable part in the movement of said manually operable means in one direction along the column to effect a concurrent rotative movement of the column, and means automatically controlling the operation of said gearing to produce an alternate rotation of the column in reverse directions through substantially 180°.

In testimony that I claim the foregoing as my invention, I have signed my name hereto.

RICHARD LABORDA.